Oct. 26, 1965   H. J. MacKENZIE   3,213,947
CUSHIONED FRAME FOR AGRICULTURAL IMPLEMENT
Filed Feb. 19, 1964
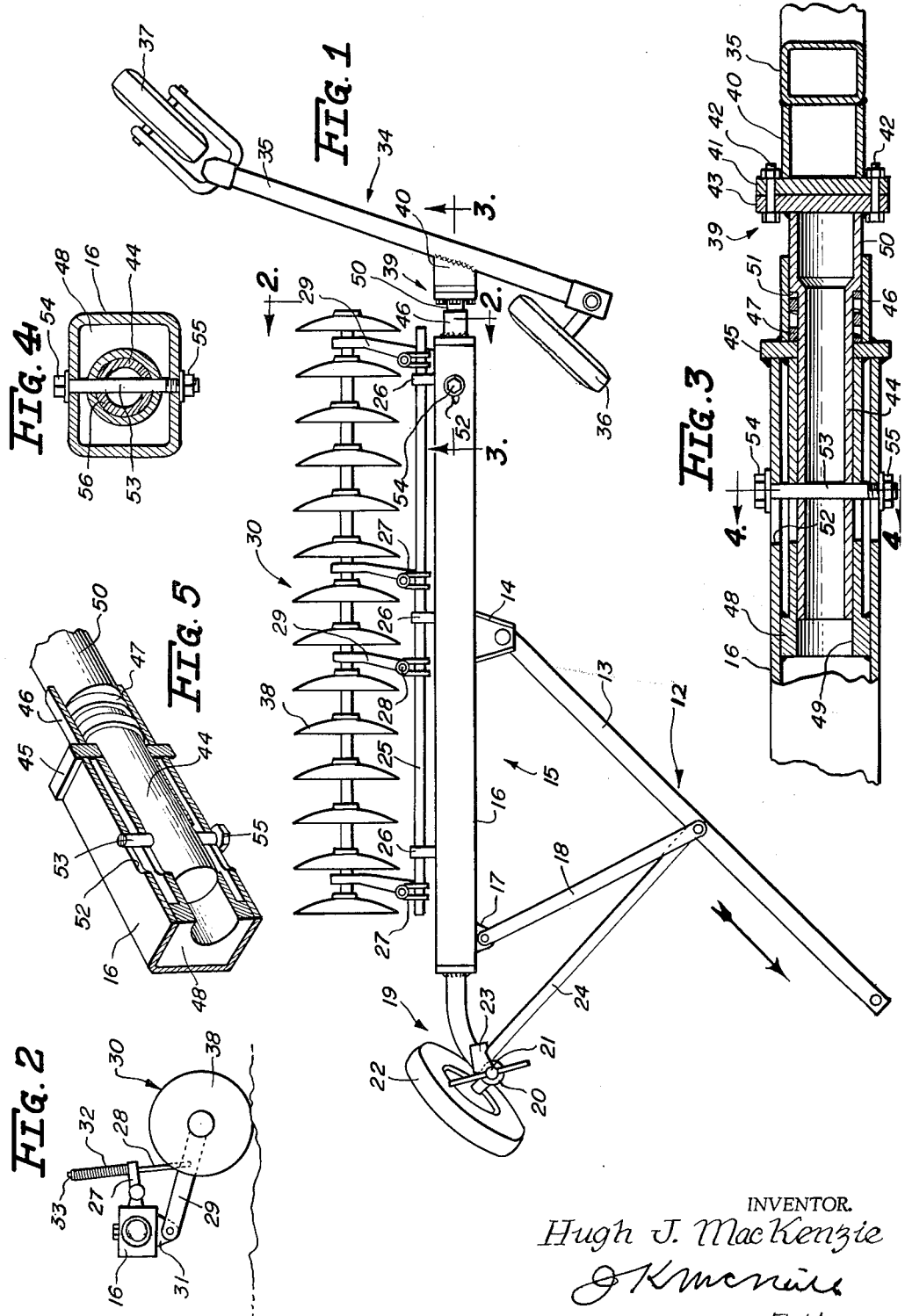
INVENTOR.
Hugh J. MacKenzie
J K McNeir
Atty.

3,213,947
CUSHIONED FRAME FOR AGRICULTURAL IMPLEMENT

Hugh J. MacKenzie, Ancaster, Ontario, Canada, assignor to International Harvester Company, Chicago, Ill., a corporation of New Jersey
Filed Feb. 19, 1964, Ser. No. 340,977
3 Claims. (Cl. 172—578)

This invention relates to agricultural implements and particularly to a novel disk tiller.

A disk tilling machine, such as the harrow plow shown in the drawings, usually comprises an elongated disk-carrying frame extending diagonally of the direction of travel and supported at its front end by a wheel and at its rear end by a wheeled truck, extending at an angle to the main frame and having one wheel arranged to travel on unplowed ground and another wheel arranged to ride in the furrow and against the furrow wall made by the operating disks. Abnormal draft loads are transmitted from the disks axially through the tool-carrying frame laterally to the rear wheeled truck, and the implement is especially susceptible to damage from stones. When a disk strikes a stone or other obstruction the machine may jump over the stone or the rear furrow wheel may jump out of the furrow to allow the disk to pass around the stone. On the other hand, the disk may break.

Therefore, an object of this invention is the provision of a novel agricultural implement of the type referred to having incorporated therein means for eliminating the disadvantages referred to.

Another object of the invention is the provision of a disk tilling implement of novel construction having means for cushioning the shock loads occasioned by the disk striking stones, and the like, in operation.

Another object of the invention is the provision of a disk tilling implement having a telescopic connection between the tool-carrying frame and the rear wheeled truck and yieldable means in the connection to allow the tool-carrying frame to yield laterally in the direction of the furrow wall when shock loads are encountered by the disks.

Other objects and advantages of the invention will become clear from the following detailed description when read in conjunction with the accompanying drawings wherein:

FIG. 1 is a plan view of a disk tiller in the form of a harrow plow incorporating the features of this invention;

FIG. 2 is a section taken on line 2—2 of FIG. 1;

FIG. 3 is a fragmentary section, on an enlarged scale, taken on the line 3—3 of FIG. 1;

FIG. 4 is a section taken on the line 4—4 of FIG. 3; and

FIG. 5 is a perspective view of a portion of the harrow frame broken away showing the limited telescopic association between the rear wheeled truck and the tool-carrying frame.

The harrow plow shown in the drawings comprises a hitch structure 12 including a draft bar 13 adapted to be pivotally connected to a tractor, not shown, at one end and at its other end is bent upwardly for pivotal reception in an opening in a lug 14 affixed to the central portion of a longitudinally elongated diagonally extending implement frame 15 comprising a disk carrying section 16 to which the lug 14 is affixed, and having another lug 17 secured adjacent its forward end to which is pivotally connected one end of another draft bar 18, the other end of which is pivoted to draft bar 13 medially of its ends.

To the forward end of frame section 16 is connected a forward wheel supporting frame 19 having secured to its forward end a vertically extending bearing 20 in which is rotatable spindle 21, on the lower end of which is mounted a wheel 22. An arm 23 mounted on the upper end of spindle 21 is connected by a bar 24 to draft bar 13.

A shaft 25 is rockably mounted in bearing blocks 26 affixed to tool section 16, which is rectangular in cross-section, as shown in FIG. 4, and a plurality of rearwardly extending arms 27 mounted on shaft 25 slidably carry vertically extending rods 28, the lower ends of which are connected to arms 29, the outer ends of which support the gang of disks 30. The other ends of arms 29 are pivotally connected to lugs 31 secured to the underside of the tool-carrying frame section 16. The upwardly projecting end of each of the rods 28 is surrounded by a spring 32 having its lower end engaging arm 27 and its upper end a nut 33.

The rear end of the implement frame 15 is supported by a relatively stationary wheel supported frame section or truck 34 comprising a frame bar 35, rectangular in section, disposed at an angle to the tool-carrying frame section 16 and carrying at one end a land wheel 36 and at its other end a furrow wheel 37 adapted to ride in the furrow and engage the furrow wall formed by the earth-working disks 38 of the gang 30 to offset side draft forces encountered in plowing.

A connecting member 39 includes a base portion 40 affixed to beam 35 medially of its ends and having a flange 41 secured by bolts 42 to a flange 43 at the end of the tube section 44 slidably associated with the tubular rear end of tool-carrying frame section 16.

A flange 45 is provided at the rear end of frame section 16 and has secured thereto a reduced diameter tubular extension 46 in which is housed a coil spring 47. Flange 45 is also affixed to the rear end of an inner block 48 having a cylindrical bore 49 adapted to slidably and telescopically receive and conform to the shape of the tubular member 44, the radially inner portion of flange 45 serving as a shoulder to engage one end of spring 47. Tubular member 44 has an enlargement 50 forming a shoulder 51 engageable with the other end of spring 47. Thus axial movement of tool-carrying frame 16 relative to the wheeled truck 34 is against the bias of spring 47, cushioning for the tool-carrying frame.

Sliding movement of the tool-carrying frame section 16 relative to the wheeled truck 34 is resisted by the spring 47 and limited by the provision of registering slots 52 in the housing of frame section 16 and the block 48, slidably receiving a pin or bolt 53 having a head 54 at one end and threaded at its other end to receive a nut 55.

It is believed that the construction and operation of the novel disk tiller of this invention will be clearly understood from the foregoing description. It should likewise be understood that the invention has been described in its preferred embodiment only, and that modifications may be made therein without departing from the spirit of the invention or the scope of the appended claims.

What is claimed is:

1. A disk tiller having an elongated frame extending diagonally of the direction of travel comprising a wheel supported section at its forward end, a relatively stationary wheel supported section at its rear end, a disk-carrying member extending between said wheel supported sections and forming a furrow wall engageable by said rear wheel supported section to prevent lateral movement of the tiller in one direction, said disk-carrying section including a tubular portion mounted on each of said sections and telescopically connected for axial sliding movement of one of said sections relative to the other in response to draft forces acting on said disks, and means in the connection of said tubular portions yieldably opposing said relative axial sliding movement.

2. A disk tiller having an elongated frame extending diagonally of the direction of travel comprising a wheel supported section at its forward end, a relatively stationary wheel supported section at its rear end, a disk-carrying member extending between said wheel supported sections including a tubular portion mounted on each of said sections and telescopically connected for axial sliding movement of one of said sections relative to the other in response to draft forces acting on said disks, and means in the connection of said tubular portions yieldably opposing said relative axial sliding movement, one of said tubular portions having a longitudinally extending slot and the other of said portions carrying a pin slidably receivable in said slot to limit the relative axial movement of said sections.

3. The invention set forth in claim 2, wherein one of said tubular portions is provided with an internal shoulder and the other of said tubular portions is provided with a reduced portion surrounded by a coil spring and a shoulder to confine said spring therebetween and said first mentioned shoulder to resist relative movement between said sections.

References Cited by the Examiner

UNITED STATES PATENTS

| 1,496,895 | 6/24 | Kurtz | 172—310 X |
| 2,432,417 | 12/47 | Heath. | |

FOREIGN PATENTS 699,780  11/53  Great Britain.

ANTONIO F. GUIDA, *Primary Examiner.*

T. GRAHAM CRAVER, *Examiner.*